United States Patent
Coulson et al.

(10) Patent No.: US 7,114,918 B2
(45) Date of Patent: Oct. 3, 2006

(54) FISH FRIENDLY HYDRAULIC TURBINE DISTRIBUTOR

(75) Inventors: Stuart Thomas Coulson, Beaconsfield (CA); Teodoro Angelo Ottaviano, Montreal (CA)

(73) Assignee: General Electric Canada, Inc., Mississauga (CA)

( * ) Notice: Subject to any disclaimer, the term of this patent is extended or adjusted under 35 U.S.C. 154(b) by 55 days.

(21) Appl. No.: 10/781,765

(22) Filed: Feb. 20, 2004

(65) Prior Publication Data

US 2005/0186068 A1    Aug. 25, 2005

(51) Int. Cl.
*F01D 9/00* (2006.01)
(52) U.S. Cl. ...................................... 415/163
(58) Field of Classification Search ......... 415/160–165
See application file for complete search history.

(56) References Cited

U.S. PATENT DOCUMENTS 2,010,555 A * 8/1935 Moody ........................ 415/129
3,512,899 A * 5/1970 Lindquist .................... 415/126
5,441,384 A * 8/1995 Gokhman ................... 415/161

FOREIGN PATENT DOCUMENTS

| CA | 1039151 | 9/1978 |
| DE | 199 50 227 A1 | 11/2000 |
| DE | 199 50 228 A1 | 11/2000 |
| WO | WO 99/15789 A1 | 4/1999 |

* cited by examiner

*Primary Examiner*—Edward K. Look
*Assistant Examiner*—Devin Hanan

(57) ABSTRACT

A hydraulic turbine has a distributor located between the scroll of the turbine and its runner. The distributor has upper and lower stay ring portions with stay vanes extending therebetween. A plurality of movable wicket gates control flow of liquid through the distributor. The lower and upper stay ring portions have built up fish friendly projections adjacent sweep areas defined where the wicket gates sweep across the lower and upper stay ring portions. The projections also extend outwardly of the upper and lower stay ring portions adjacent the sweep areas and act as barriers preventing fish from being trapped between the wicket gates and the stay ring. Each projection has a sill portion projecting outwardly at least coextensive with, and adjacent to, one sweep area and a first apron portion extending from the sill portion to an appropriate one of the upper and lower stay ring portions.

29 Claims, 4 Drawing Sheets

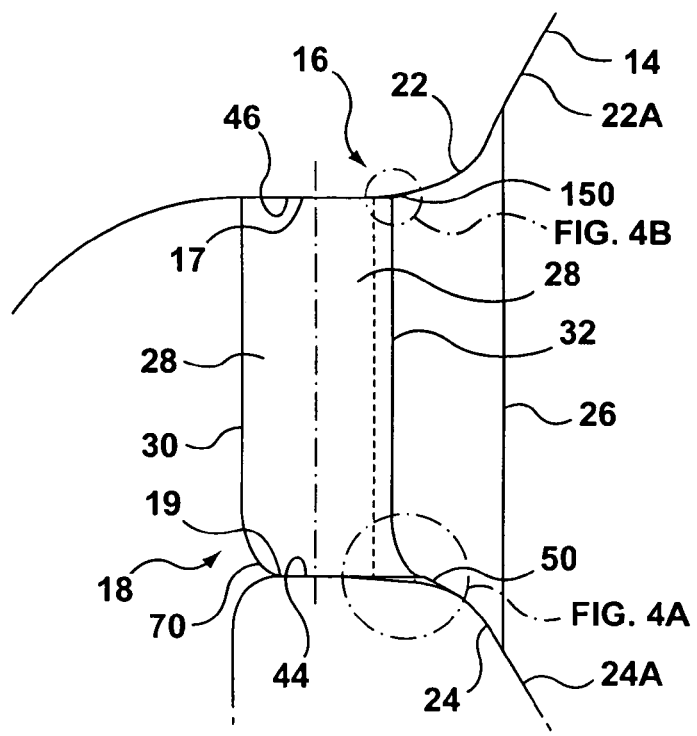
FIG. 3
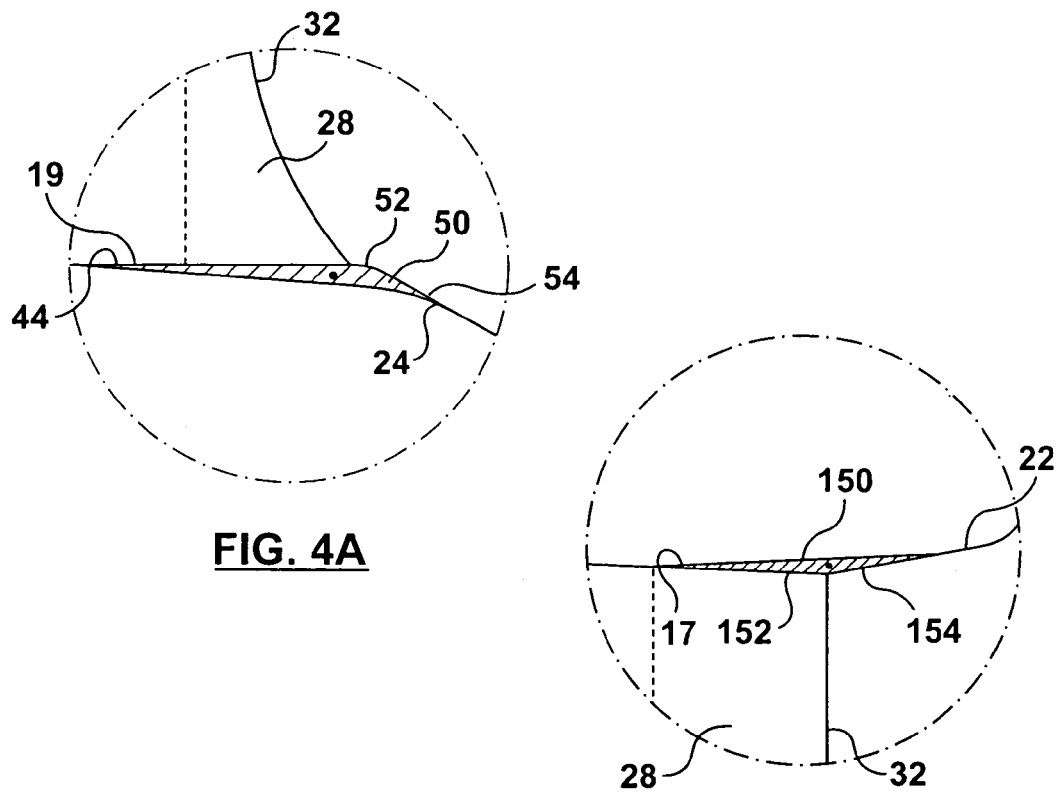
FIG. 4A
FIG. 4B

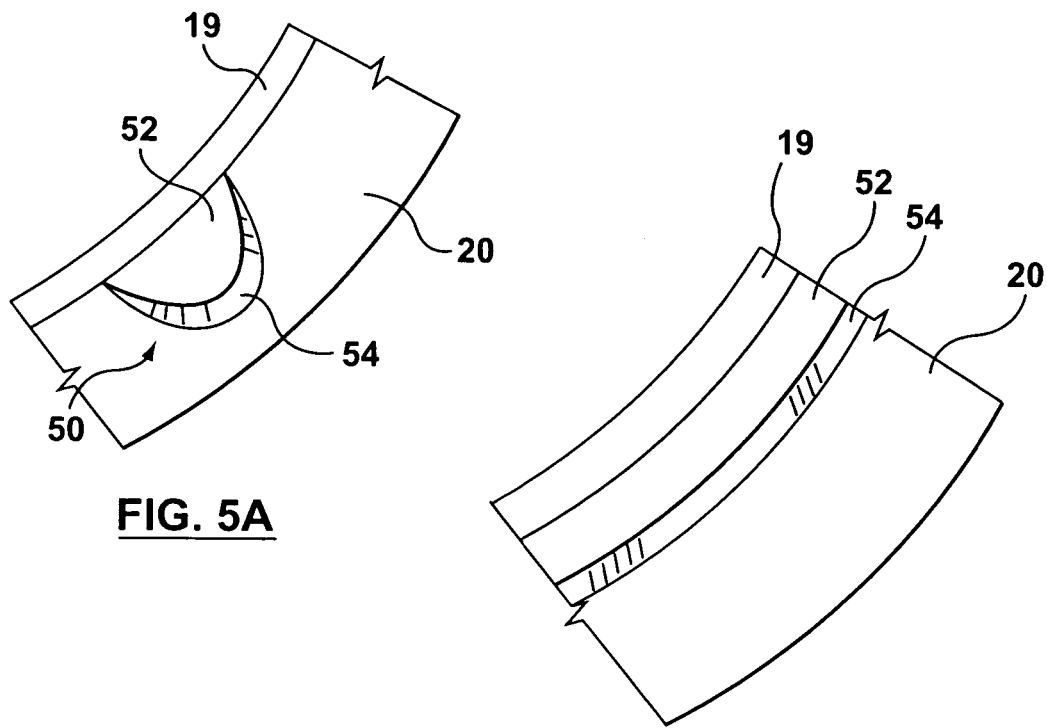
FIG. 5A
FIG. 5B
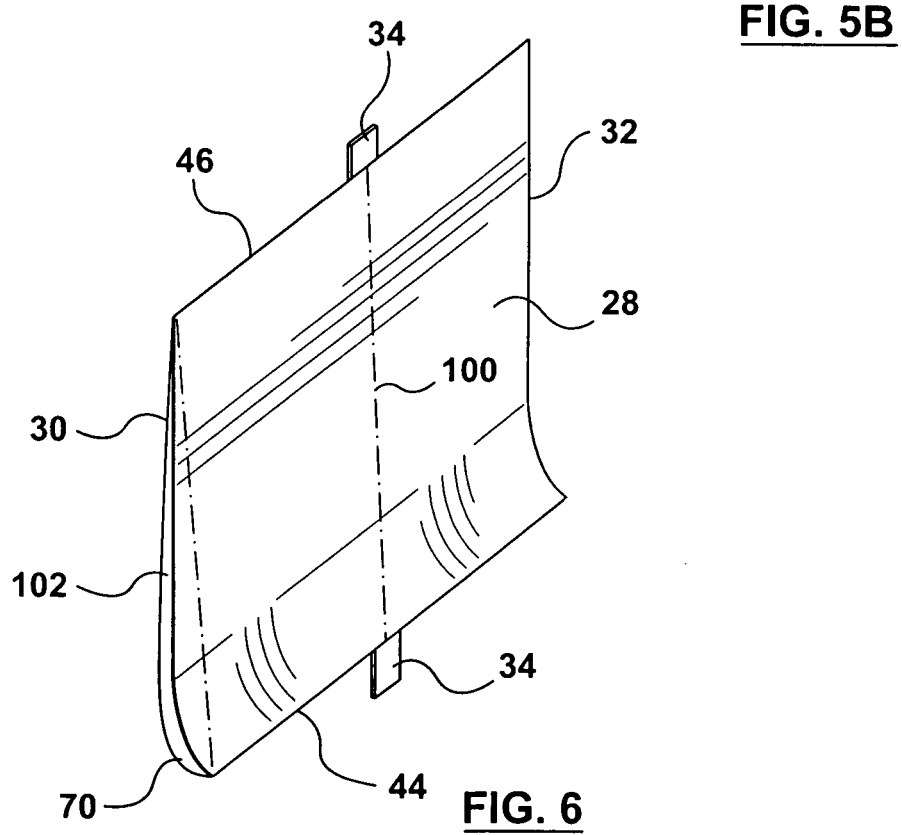
FIG. 6

FISH FRIENDLY HYDRAULIC TURBINE DISTRIBUTOR

FIELD OF THE INVENTION

The present invention relates to a hydraulic turbine distributor and, in particular, relates to a stay ring in the distributor having one or more fish friendly projections located adjacent wicket gate sweep areas for guiding fish through the distributor.

BACKGROUND OF THE INVENTION

In previous arrangements for conventional reaction type turbines liquid is introduced into the turbine through a distributor. The distributor interconnects the turbine with a volute shaped scroll casing. The distributor includes an internal stay ring comprising an annular array of guide vanes for the purposes of maintaining the sectional shape and integrity of the scroll, and to direct the passage of liquid in relation to a slot-like opening of the distributor to which the scroll casing is connected.

The distributor provides a flow mouth connecting the scroll with the runner of the turbine. The runner of the turbine, for example, may comprise an axial type runner or a Francis type runner. Extending across the slot-like opening of the distributor at the flow mouth are a plurality of wicket gates. The wicket gates are movable between a closed position preventing the flow of such liquid through the flow mouth and an open position permitting liquid flow from the scroll, through the flow mouth of the distributor and across the turbine runner.

Previous designs for the wicket gates have provided a wicket gate having an outer, upstream or leading edge portion and an inner, downstream or trailing edge portion. The outer edge portions of the wicket gates, when in the open position, project forward and displaced from portions of the stay ring. This creates gaps between the wicket gates and the stay ring which are known to trap fish passing through the turbine. Further, the downstream inner edge portion of each wicket gate typically extends over the distributor and, as a result, creates shear forces downstream of the distributor. These shear forces have an adverse effect on any fish swimming through the turbine and passing in the vicinity of these shear forces.

With the increased awareness of the negative impact of the wicket gate structures of previous hydraulic turbines, it is recognized that there is a need for improved structures which are more friendly to fish passing through the distributor.

SUMMARY OF THE INVENTION

The present invention relates to a hydraulic turbine distributor and, in particular, relates to a stay ring in the distributor having one or more fish friendly projections. The one or more projections are located on a lower stay ring portion and, optionally, on the upper stay ring portion, adjacent one or more sweep areas. The sweep areas are defined adjacent the stay ring where an outer edge portion of a wicket gates passes during gate opening. The one or more fish friendly projections act as one or more barriers preventing fish from being trapped between the wicket gates and the stay ring lower portion, and optionally, the stay ring upper portion.

The stay ring has upper and lower stay ring portions and a plurality of stay vanes spaced apart in an annular array and each extending between the upper and lower stay ring portions. In one embodiment a single continuous projection extends outwardly from a lower stay ring portion and, optionally, from an upper stay ring portion. This single continuous projection forms a ring about the flow mouth and extends adjacent the sweep areas of all of the wicket gates. In another embodiment a plurality of projections extend outwardly from the lower stay ring portion and, optionally, an upper stay ring portion. Each of the projections is located adjacent a corresponding sweep area adjacent the lower stay ring portion and, optionally, adjacent a corresponding sweep area adjacent the upper stay ring portion.

The flow mouth may have upper and lower lips positioned horizontally inwardly of the upper and lower stay ring portions. Each of the upper and lower lips is respectively vertically offset inwardly from corresponding portions of the upper and lower stay ring portions. The plurality of wicket gates are rotatably mounted between the upper and lower lips. The wicket gates are moveable between open and closed positions respectively permitting and inhibiting liquid flow through the distributor and defining the sweep areas adjacent the upper and lower stay ring portions. In one embodiment, the at least one first fish friendly projection extends from the lower stay ring portion. The fish friendly projection has a first sill portion projecting outwardly of the lower lip and at least coextensive with, and adjacent to, at least one of the sweep areas. The fish friendly projection has a first apron portion extending from the first sill portion to lower stay ring portion. The apron directs fish thereover and onto the sill preventing fish from being trapped by the wicket gate.

The projections may comprise, in addition to the first fish friendly projections, second fish friendly projections. The second fish friendly projection for each of the wicket gates extends from the upper stay ring portion and acts as one or more second barriers preventing fish from being trapped between the wicket gates and the upper stay ring portion. The second fish friendly projection has a second sill portion projecting outwardly of the upper lip and at least coextensive with, and adjacent to, at least one of the sweep areas. The second fish friendly projection has a second apron portion extending from the second sill portion to upper stay ring portion. The second apron directs fish thereover and onto the sill preventing fish from being trapped by the wicket gate.

In one embodiment, the first sill portion projects outwardly of the lower lip at the same horizontal level as the lower lip. Also, the second sill portion projects outwardly of the upper lip at the same horizontal level as the upper lip. This results in the wicket gates having the same clearance at the upper and lower lips of the flow mouth as the first and second projections and thereby reduces the chance of fish becoming trapped between the wicket gates and the stay ring.

In one embodiment each of the wicket gates has a bottom gate portion that extends from the outer edge portion of the wicket gate to an inner edge portion of the wicket gate. The inner edge portion of the wicket gate has a concavely recessed portion adjacent the bottom gate portion whereby the concavely recessed portion of the inner edge portion of the wicket gate does not extend beyond the distributor into the turbine when the wicket gate is in its open position so as to reduce shear forces adjacent thereto.

In one embodiment each of the wicket gates has a top gate portion that extends between the inner and outer edge portions of the wicket gate. Each of the wicket gates pivots about trunnions that extend vertically within the distributor across the flow mouth. The inner edge portion of the wicket gate slopes forward from the top gate portion to the bottom gate portion and outwardly from the top gate portion to the bottom gate portion. This permits the inner edge portion to overlie an adjacent wicket gate when in the closed position while at the same time permitting for a concavely recessed portion that does not extend beyond the distributor when the wicket gate is in the open position.

In accordance with the present invention there is provided a hydraulic turbine distributor comprising a stay ring and a flow mouth located inside of the stay ring. The distributor has a plurality of wicket gates mounted to the flow mouth. The wicket gates have outer edge portions moveable adjacent the stay ring to define sweep areas adjacent the stay ring. The distributor has at least one first fish friendly projection extending outwardly of the stay ring adjacent the sweep areas acting as a first barrier preventing fish from being trapped between the wicket gates and the stay ring.

BRIEF DESCRIPTION OF THE DRAWINGS

For a better understanding of the nature and objects of the present invention reference may be had to the following detailed description when taken in conjunction with the accompanying diagrammatic drawings wherein:

FIG. 3 is a side sectional view of the distributor of the present invention illustrating the placement of one of the wicket gates in the distributor;

FIG. 4A is an enlarged view of the distributor showing the fish friendly projection adjacent the lower outer edge of the wicket gate and the lower stay ring portion;

FIG. 4B is an enlarged view of the distributor showing the fish friendly projection adjacent the upper outer edge of the wicket gate and the upper stay ring portion;

FIG. 5A shows one embodiment of the fish friendly projection of FIG. 4A;

FIG. 5B shows another embodiment of the fish friendly projection of FIG. 4A; and, FIG. 6 is a perspective view of the wicket gate showing the trailing inner edge of the wicket gate.

DETAILED DESCRIPTION OF THE INVENTION

The present invention relates to a hydraulic turbine distributor and, in particular, relates to a stay ring in the distributor having one or more fish friendly projections located adjacent wicket gate sweep areas for guiding fish through the distributor.

Figure 1:
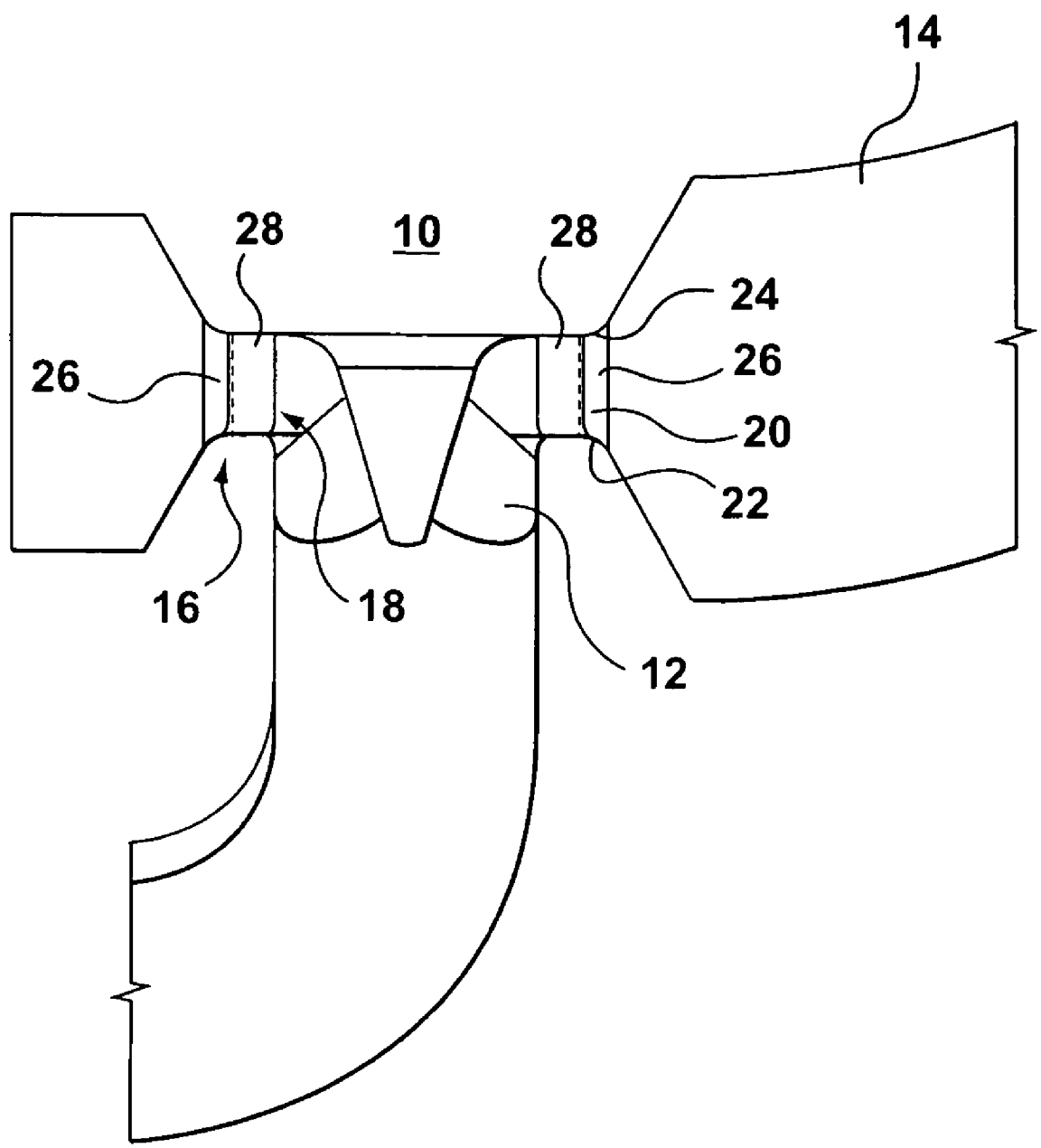
FIG. 1 is a view of a hydraulic turbine utilizing the distributor of the present invention.

Referring to FIG. 1 there is shown an axial type hydraulic turbine 10 having a runner 12. It should be understood that while an axial type turbine is shown in FIG. 1, in an alternative embodiment, the turbine could comprise either a Francis type turbine or a reversible pump turbine.

The hydraulic turbine 10 further has a scroll 14 for directing liquid into the turbine 10. The runner 12 rotates in response to liquid passing through the turbine 10. The turbine 10 further includes a distributor 16 interconnecting the scroll 14 with the runner 12. The distributor 16 has a flow mouth 18 for directing and controlling the flow of liquid from the scroll 14 past the runner 12. The flow mouth 18 has upper and lower lips 17, 19.

The distributor 16 has a stay ring 20 that has upper and lower stay ring portions 22, 24. The stay ring 20 has a plurality of spaced apart stay vanes 26 each extending between the upper and lower stay ring portions 22, 24. The stay vanes 26 form an annular array of vanes. The stay vanes 26 act to hold the upper and lower stay ring portions 22 and 24 together and to guide or direct liquid through the flow mouth 18 in a predetermined manner. The stay ring 20 is typically bolted between the flow mouth 18 and the scroll 14. As shown in FIGS. 3, 4A and 4B, the upper and lower lips 17, 19 of the flow mouth 18 are spaced horizontally inward of the stay ring 20. Also the upper and lower lips 17, 19, while forming a continued surface respectively with upper and lower stay ring portions 22, 24, are vertically offset inwardly from outer portions 22A and 24A of the stay ring portions 22, 24 due to the curvature associated with the stay ring 20.

The distributor 16 has a series or plurality of annularly spaced about wicket gates 28. The wicket gates 28 are mounted across the flow mouth 18 between the upper and lower lips 17, 19. The wicket gates 28 are located inside of the stay ring 20 when closed. The wicket gates 28 are movable between open and closed positions respectively permitting and inhibiting water flow or liquid flow through the flow mouth 18 of the distributor 16.

Figure 2A:
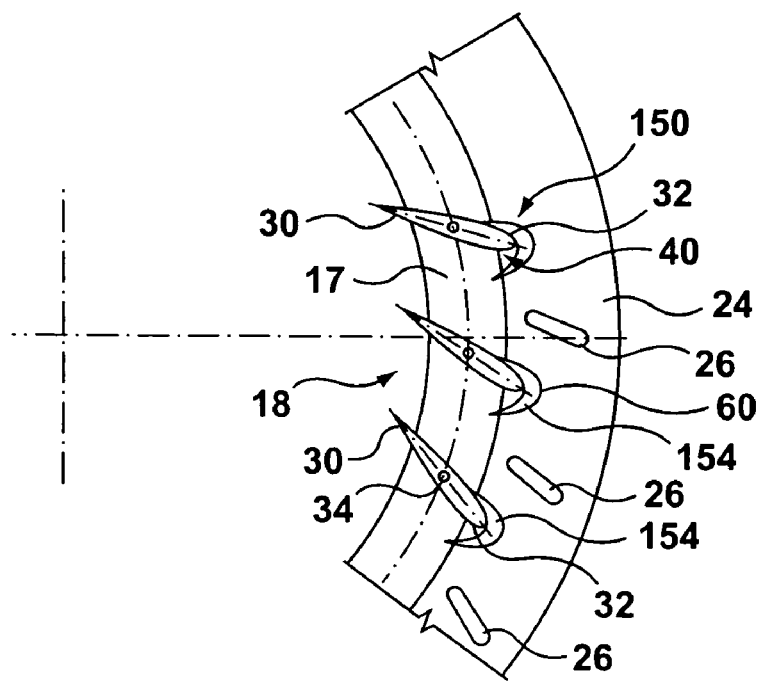
FIG. 2A is a partial top plan view of the distributor of the present invention.
Figure 2B:
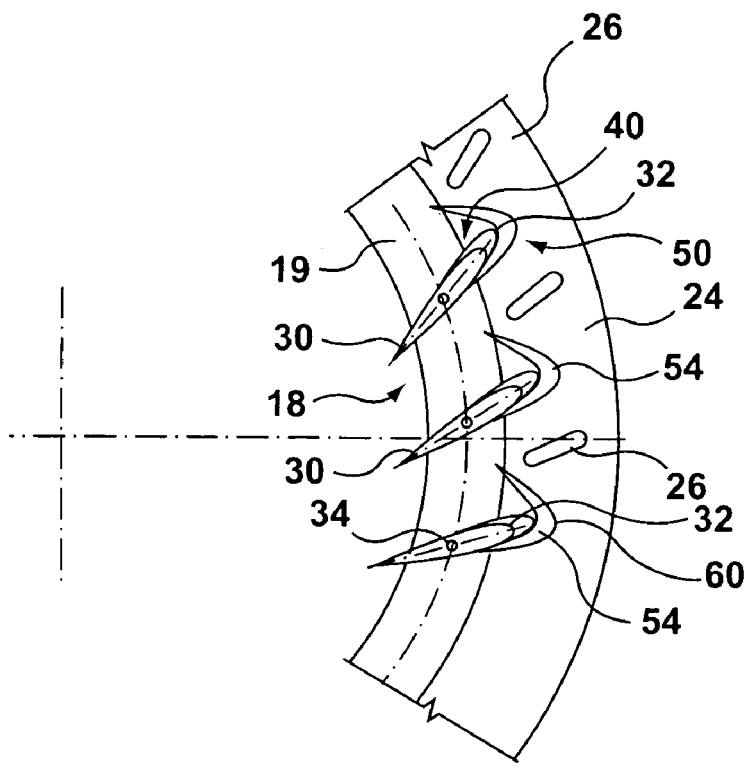
FIG. 2B is a partial bottom plan view of the distributor of the present invention.

The plan views of FIGS. 2A and 2B show the wicket gates 28 in an open position. Referring to FIGS. 2A, 2B and 3, the wicket gates 28 have an inner or trailing downstream edge portion 30 and an outer or upstream leading edge portion 32. The inner edge portion 30 is more elongated than the outer edge portion 32 which is somewhat rounded. Movement of the wicket gates 28 is about trunnions 34 mounted into the distributor opposing lips 17, 19. The outer edge portion 32 of the wicket gate 28 sweeps over the upper and lower stay ring portions 22 to define sweep areas 40 adjacent the upper and lower stay ring portions 22, 24. It should be understood that sweep areas 40 in the upper and lower stay ring portions 22, 24 may not be the same size or shape because the wicket gates 28 may not have the same shape at the top and bottom of the gates. Each of the wicket gates 28 has a lower gate portion 44 that extends from the outer edge portion 32 to the inner edge portion 30. Further, each of the wicket gates 28 has a upper gate portion 46 that also extends from the outer edge portion 32 to the inner edge portion 30.

In accordance with the present invention as shown in FIGS. 2A, 2B, 3, 4A, 4B, and 5A, there is a corresponding fish friendly projection 50 that extends upwardly from the lower stay ring portion 24 and a corresponding projection 152 that extends downwardly of the upper ring portion 22 for each wicket gate 28. The projection 50 has an apron portion 54 terminating immediately adjacent the sweep area 40 so as to guide fish into the flow mouth 18 of the distributor 16 and to act as a barrier preventing fish from being trapped between the wicket gate 28 and the lower stay ring portion 24 of the stay ring 20. The fish friendly projection 50 has a generally flat sill 52 that projects outwardly of the lower lip 19 and is co-extensive with and adjacent to the sweep area 40. The sill 52 is built up from the lower stay ring portion 24 to be horizontally level with the lower lip 19. The projection 50 is built from the lower stay ring portion 24 by a weld. Also, each projection 150 has an apron 154 and a sill 152. Apron 154 and sill 152 are similar in construction to apron 54 and sill 52 of projection 50 except that they are built from upper stay ring portion 22.

Both aprons 54 and 154 are angled to provide a ramp like effect. As shown in FIGS. 2A, 2B, the projection aprons 52,152 each partially surrounds the sweep area 40 and the aprons 52, 152 each has a generally rounded V-shape whose apex 60 is located outwardly of the distributor 16. This embodiment however requires more labor to build a continuous projection about the lips of the flow mouth when compared to the use of a plurality of corresponding projections for each wicket gate.

Referring to FIG. 5B, an alternative embodiment is shown for the projection 50. In this embodiment only one projection 50 is utilized which extends in a continuous ring about the lower lip 19 of the flow mouth 18. The projection 50 has an annular sill 52 and an annular apron 54.

In accordance with another aspect as best seen in FIGS. 3 and 6, the inner edge portion 30 of the wicket gate 28 has a concavely recessed portion 70 adjacent the lower gate portion 44. The concavely recessed portion 70 does not extend beyond the distributor 16 in to the turbine 10 when the wicket gate 28 is in its open position so as to reduce shear forces adjacent and downstream of the wicket gates 28. Each of the wicket gates 28 pivot about the trunnions that extend vertically along axis 100 within the distributor 16 and the inner edge portion 30 has a surface 102 that slopes forward from the upper gate portion 46 to the lower gate portion 44. The inner edge portion 30 also slopes forward from the upper gate portion 46 to the lower gate portion 44 and outwardly of the distributor from the upper gate portion 46 to the lower gate portion 42. This sloping surface 102 permits for the wicket gates 28 to be mounted on their trunnions 34 further out from the center of the distributor lips. This allows the inner edge portions 30 of the wicket gates 28 to overlap with the outer edge portions 32 of adjacent wicket gates 28 and effectively provide a barrier to water flow when the wicket gates 28 are in the closed position. The sloping surface 102 thereby compensates for the recessed concave surface area 70 which would otherwise provide a gap permitting for water to flow past the wicket gates 28 and into the turbine even when the wicket gates 28 were in the closed position.

While the invention has been described in terms of very specific embodiments, those skilled in the art will recognize that the invention can be practiced with modification within the spirit and scope of the claims.

What is claimed is:

1. A hydraulic turbine distributor comprising:
   a stay ring comprising upper and lower stay ring portions and a plurality of annularly spaced apart stay vanes each extending between the upper and lower stay ring portions;
   a flow mouth located inside of the stay ring;
   a plurality of wicket gates mounted to the flow mouth and having outer edge portions moveable adjacent the stay ring to define sweep areas adjacent the upper and lower stay ring portions of the stay ring; and,
   at least one first fish friendly projection extending from at least one of the upper and lower stay ring portions of the stay ring adjacent the sweep areas and acting as a first barrier preventing fish from being trapped between the wicket gates and the stay ring.

2. The hydraulic turbine of claim 1 wherein:
   the flow mouth has upper and lower lips positioned inwardly of the upper and lower stay ring portions, and each of the upper and lower lips is respectively vertically offset inwardly from corresponding portion of the upper and lower stay ring portions;
   the plurality of wicket gates are rotatably mounted between the upper and lower lips, and the wicket gates are moveable between open and closed positions respectively permitting and inhibiting liquid flow through the distributor and to define the sweep areas; and,
   the at least one first fish friendly projection extends from the lower stay ring portion, and the fish friendly projection has a first sill portion projecting outwardly of the lower lip and at least coextensive with, and adjacent to, at least one of the sweep areas, and a first apron portion extending from the first sill portion to the lower stay ring portion.

3. The hydraulic turbine of claim 2 wherein the first sill portion projects outwardly of the lower lip at the same horizontal level as the lower lip.

4. The hydraulic turbine distributor of claim 2 wherein the apron portion slopes providing a first ramp effect between the lower lip and the first sill portion.

5. The hydraulic turbine distributor of claim 2 wherein the at least one first fish friendly projection is built by a weld formed on the lower stay ring portion.

6. The hydraulic turbine distributor of claim 2 wherein each of the wicket gates has an inner edge portion and a lower gate portion extending from the outer edge portion to the inner edge portion, and wherein the inner edge portion has a concavely recessed portion adjacent the lower gate portion whereby the concavely recessed portion of the inner edge portion does not extend beyond the lower lip and into the turbine when the wicket gate is in its open position so as to reduce shear forces adjacent thereto.

7. The hydraulic turbine distributor of claim 6 wherein each of the wicket gates has a upper gate portion extending between the inner and outer edge portions, each of the wicket gates pivoting about trunnions that extend vertically within the distributor and the outer edge portion sloping forward from the upper gate portion to the lower gate portion and outwardly of the distributor from the upper gate portion to the lower gate portion.

8. The hydraulic turbine of claim 2 further comprising at least one second fish friendly projection extending from the upper stay ring portion and acting as a second barrier preventing fish from being trapped between at least one of the wicket gates and the upper stay ring portion, the at least one second fish friendly projection having a second sill portion projecting outwardly of the upper lip and at least coextensive with, and adjacent to, at least one of the sweep areas, and the at least one second fish friendly projection having a second apron portion extending from the second sill portion to the upper stay ring portion.

9. The hydraulic turbine of claim 2 wherein the first sill portion projects outwardly of the lower lip at the same horizontal level as the lower lip and wherein the second sill portion projects outwardly of the upper lip at the same horizontal level as the upper lip.

10. The hydraulic turbine distributor of claim 2 wherein the first apron portion slopes providing a first ramp effect between the lower lip and the first sill portion and wherein the second apron portion slopes providing a second ramp effect between the upper lip and the second sill portion.

11. The hydraulic turbine distributor of claim 2 wherein the at least one first fish friendly projection is built by a first weld formed on the lower stay ring portion and the at least one second fish friendly projection is built by a second weld formed on the upper stay ring portion.

12. The hydraulic turbine distributor of claim 2 wherein each of the wicket gates has an inner edge portion and a lower gate portion extending from the outer edge portion to the inner edge portion, and wherein the inner edge portion has a concavely recessed portion adjacent the lower gate portion whereby the concavely recessed portion of the inner edge portion does not extend beyond the lower lip and into the turbine when the wicket gate is in its open position so as to reduce shear forces adjacent thereto.

13. The hydraulic turbine distributor of claim 12 wherein each of the wicket gates has an upper gate portion extending between the inner and outer edge portions, each of the wicket gates pivoting about trunnions that extend vertically within the distributor and the outer edge portion sloping forward from the upper gate portion to the lower gate portion and outwardly of the distributor from the upper gate portion to the lower gate portion.

14. The hydraulic turbine distributor of claim 1 wherein the at least one first fish friendly projection comprises a first corresponding fish friendly projection for each of the wicket gates extending from the lower stay ring portion and acting as first barriers preventing fish from being trapped between the wicket gates and the lower stay ring portion, the first fish friendly projection having a first sill portion projecting outwardly of the lower lip and at least coextensive with, and adjacent to, at least one of the sweep areas, and the at least one fish friendly projection having a first apron portion extending from the first sill portion to the lower stay ring portion.

15. The hydraulic turbine distributor of claim 14 wherein:
the flow mouth has upper and lower lips positioned inwardly of the upper and lower stay ring portions, and each of the upper and lower lips is respectively vertically offset inwardly from corresponding portions of the upper and lower stay ring portions; and,
the plurality of wicket gates are rotatably mounted between the upper and lower lips, and the wicket gates are moveable between open and closed positions respectively permitting and inhibiting liquid flow through the distributor and to define the sweep areas.

16. The hydraulic turbine of claim 15 wherein the first sill portion projects outwardly of the lower lip at the same horizontal level as the lower lip.

17. The hydraulic turbine distributor of claim 15 wherein the apron portion slopes providing a first ramp effect between the lower lip and the first sill portion.

18. The hydraulic turbine distributor of claim 15 wherein the first corresponding fish friendly projection is built by a weld formed on the lower stay ring portion.

19. The hydraulic turbine distributor of claim 15 wherein the first apron portion partially surrounds the sweep area and, in plan view, has a generally rounded V-shape whose apex is located outwardly of the distributor.

20. The hydraulic turbine distributor of claim 15 wherein each of the wicket gates has an inner edge portion and a lower gate portion extending from the outer edge portion to the inner edge portion, and wherein the inner edge portion has a concavely recessed portion adjacent the lower gate portion whereby the concavely recessed portion of the inner edge portion does not extend beyond the lower lip and into the turbine when the wicket gate is in its open position so as to reduce shear forces adjacent thereto.

21. The hydraulic turbine distributor of claim 20 wherein each of the wicket gates has a upper gate portion extending between the inner and outer edge portions, each of the wicket gates pivoting about trunnions that extend vertically within the distributor and the outer edge portion sloping forward from the upper gate portion to the lower gate portion and outwardly of the distributor from the upper gate portion to the lower gate portion.

22. The hydraulic turbine of claim 15 further comprising a second corresponding fish friendly projection for each of the wicket gates extending from the upper stay ring portion and acting as second barriers preventing fish from being trapped between the wicket gates and the upper stay ring portion, the second fish friendly projection having a second sill portion projecting outwardly of the upper lip and at least coextensive with, and adjacent to, at least one of the sweep areas, and the second fish friendly projection having a second apron portion extending from the second sill portion to the upper stay ring portion.

23. The hydraulic turbine of claim 22 wherein the first sill portion projects outwardly of the lower lip at the same horizontal level as the lower lip and wherein the second sill portion projects outwardly of the upper lip at the same horizontal level as the upper lip.

24. The hydraulic turbine distributor of claim 22 wherein the first apron portion slopes providing a first ramp effect between the lower lip and the first sill portion and wherein the second apron portion slopes providing a second ramp effect between the upper lip and the second sill portion.

25. The hydraulic turbine distributor of claim 22 wherein the first corresponding fish friendly projection is built by a first weld formed on the lower stay ring portion and the second corresponding fish friendly projection is built by a second weld formed on the upper stay ring portion.

26. The hydraulic turbine distributor of claim 22 wherein the first apron portion partially surrounds the sweep area and, in plan view, has a generally rounded V-shape whose apex is located outwardly of the distributor.

27. The hydraulic turbine distributor of claim 22 wherein each of the wicket gates has an inner edge portion and a lower gate portion extending from the outer edge portion to the inner edge portion, and wherein the inner edge portion has a concavely recessed portion adjacent the lower gate portion whereby the concavely recessed portion of the inner edge portion does not extend beyond the lower lip and into the turbine when the wicket gate is in its open position so as to reduce shear forces adjacent thereto.

28. The hydraulic turbine distributor of claim 27 wherein each of the wicket gates has a upper gate portion extending between the inner and outer edge portions, each of the wicket gates pivoting about trunnions that extend vertically within the distributor and the outer edge portion sloping forward from the upper gate portion to the lower gate portion and outwardly of the distributor from the upper gate portion to the lower gate portion.

29. The hydraulic turbine distributor of claim 14 further comprising a second corresponding fish friendly projection for each of the wicket gates extending from the upper stay ring portion and acting as second barriers preventing fish from being trapped between the wicket gates and the upper stay ring portion, the second fish friendly projection having a second sill portion projecting outwardly of the upper lip and at least coextensive with, and adjacent to, at least one of the sweep areas, and the second fish friendly projection having a second apron portion extending from the second sill portion to the upper stay ring portion.

* * * * *